United States Patent
White et al.

(10) Patent No.: US 6,885,738 B2
(45) Date of Patent: Apr. 26, 2005

(54) ACTIVATION OF ELECTRONIC LOCK USING TELECOMMUNICATIONS NETWORK

(75) Inventors: Isaac D. M. White, Orlando, FL (US); James Dickens, Ocoee, FL (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 240 days.

(21) Appl. No.: 10/374,447

(22) Filed: Feb. 25, 2003

(65) Prior Publication Data

US 2004/0165708 A1 Aug. 26, 2004

(51) Int. Cl.⁷ .............................................. H04M 11/00
(52) U.S. Cl. ............................ 379/102.06; 379/142.05; 379/93.02
(58) Field of Search ........................ 379/102.01–102.06, 379/93.02, 93.03, 142.01, 142.04–142.06, 142.13, 142.15

(56) References Cited

U.S. PATENT DOCUMENTS

| | | | |
|---|---|---|---|
| 3,939,679 A | | 2/1976 | Barker |
| 3,947,641 A | * | 3/1976 | Trell ...................... 379/102.06 |
| 4,113,986 A | * | 9/1978 | Clement et al. ....... 379/102.06 |
| 5,646,605 A | | 7/1997 | Leonaggeo |
| 5,815,557 A | | 9/1998 | Larson |
| 5,889,472 A | | 3/1999 | Nagel |
| 5,990,785 A | | 11/1999 | Suda |
| 6,040,771 A | | 3/2000 | Kim |
| 6,057,779 A | | 5/2000 | Bates |
| 6,072,402 A | | 6/2000 | Kniffin |
| 6,157,313 A | | 12/2000 | Emmermann |
| 6,192,236 B1 | | 2/2001 | Irvin |
| 6,472,973 B1 | | 10/2002 | Harold |
| 6,542,583 B1 | * | 4/2003 | Taylor ................... 379/142.05 |
| 2001/0018639 A1 | | 8/2001 | Bunn |
| 2001/0041956 A1 | | 11/2001 | Wong |
| 2002/0095960 A1 | | 7/2002 | Grover |
| 2002/0099945 A1 | | 7/2002 | McLintock |
| 2002/0112183 A1 | | 8/2002 | Baird, III |

* cited by examiner

Primary Examiner—Wing Fu Chan
(74) Attorney, Agent, or Firm—Walters & Zimmerman; Geoff Suldiffe; Todd Mitchem

(57) ABSTRACT

Methods and systems are disclosed for activating an electronic lock in an intelligent switched telecommunications network having a plurality of Advanced Intelligent Network (AIN) components. A call is received from a device communicating with the telecommunications network. The call is from a calling party to a called party. Processing of the call within the telecommunications network is suspended. A database is queried for a telephone number of the called party. The database stores telephone numbers of called parties subscribing to a lock service provided by a telecommunications service provider. The lock service allows a user to remotely activate an electronic lock using the telecommunications network. If the query is successful, processing of the call within the telecommunications network is resumed. The call is used to activate the electronic lock.

11 Claims, 9 Drawing Sheets

ACTIVATION OF ELECTRONIC LOCK USING TELECOMMUNICATIONS NETWORK

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to telephony and to computer networks and, more particularly, to methods and systems for locking and for unlocking electronic locks using an intelligently switched telecommunications network.

2. Description of the Related Art

Perhaps almost all vehicles, residences, businesses, and governmental offices utilize locks. These locks control physical access to homes, offices, buildings, and vehicles. The locks are most commonly employed on doors, yet, locks may also control access to windows, lockers, storage cabinets, safes, and many other areas and premises. Locks have long been accessed using a mechanical key, however, electronic locks have become more prevalent. These electronic locks are electrically activated to a locked or an unlocked condition using a myriad of technologies. The electronic lock usually dispenses with the mechanical key and, instead, employs various "key" technologies, such as a magnetic "swipe" card, embedded microelectronic devices/circuitry, radio frequency (RF) and/or infrared (IR) transmitters, or electronic keypad combinations. As these electronic locks become more prevalent, numerous methods and systems have been developed to activate these electronic locks.

Many electronic locks are computer-controlled. U.S. application Publication No. 2002/0099945 (Jul. 25, 2002), for example, describes a door access control system. One or more electronic door locks communicate with a computerized administration system. When a user wishes to gain access to an electronic lock, the electronic lock first identifies the user. The electronic lock then communicates with the computerized administration system to authorize the user. If the user is authenticated, a computer activates the electronic door lock. U.S. application Publication No. 2002/0095960 (Jul. 25, 2002) describes a storage locker with an electronic lock. The electronic lock has a communication port for connection to a telephone line. The communication port allows the electronic lock to be monitored and controlled from a computer at a remote location. U.S. application Publication No. 2001/0041956 (Nov. 15, 2001) describes a vehicle door lock system. A person wishing to access the vehicle may use a cellular telephone to unlock (or lock) the vehicle doors. A communication controller receives the cellular telephone communication and instructs a microcontroller to activate the door locks.

Although these electronic locks are computer-controlled, maintenance is a common concern. Not only do the electronic locks themselves require maintenance, but the computer systems that activate these electronic locks also require maintenance. These computer systems often access databases of approved users, databases of electronic locks each user may access, and various levels of authentication procedures. Some users, for example, are only authorized for general, low-level access, while other users may have higher security permissions. Because users and permissions often frequently change these databases require dynamic maintenance and update. The physical and wireless networks connecting the computer systems and the electronic locks also require maintenance. The computer hardware, too, requires much maintenance to ensure the electronic locks are always accessible to an authorized user.

All this maintenance has become an expensive problem. Most individual households do not have the resources to install and maintain electronic locks. Those businesses that may benefit from electronic locks already devote large amounts of time and money to maintain their computer systems and networks. While electronic locks provide increased security, this security is often outweighed by the added complexity and burden of additional computer system maintenance and network maintenance. There is, accordingly, a need in the art for methods and systems that utilize electronic locks for enhanced security, a need for methods and systems that reduce the maintenance of electronic locks, and a need for methods and systems that lessen the burden on existing computer systems and networks.

BRIEF SUMMARY OF THE INVENTION

The aforementioned problems and other problems are reduced by a telecommunications lock service. This lock service is provided by a telecommunications service provider. This lock service uses many existing features and capabilities of a telecommunications network to remotely activate electronic locks. The lock service of this invention allows a user to use the telecommunications network to send signals that activate these electronic locks. The user, for example, initiates a communication, such as a telephone call, with the telecommunications network. The user typically dials a telephone number corresponding to one or more electronic locks. If the user correctly dials the telephone number, and successfully negotiates any security or authentication procedures, the telecommunications network processes the communication. The communication may then be used to activate the electronic lock. The lock may be activated by the communication itself, or the communication may contain secure/encrypted data that activates the lock. If, however, the user does not dial the correct telephone number, or does not successfully negotiate the security/authentication procedures, the telecommunications network terminates the communication. The terminated communication, then, may not be used to activate the electronic lock.

This lock service is maintained by a telecommunications service provider. Heretofore the computer network implementing electronic locks had to be maintained by the user/residence/business. The lock service of this invention, however, is offered by, and maintained by, the telecommunications service provider. The telecommunications service provider offers this lock service to subscribers, and the service provider maintains the computer equipment and network that implements the lock service. When a user calls to activate an electronic lock, the telecommunications service provider performs all the authentication and security procedures. Even if the telecommunications service provider allows the subscriber to define the authentication/security procedures, the telecommunications service provider maintains the equipment that implements the authentication/security procedures. This lock service, then, relieves the subscriber of the burdens of maintaining a network of electronic locks.

This invention discloses methods and systems for using an intelligently switched telecommunications network to activate an electronic lock. Because the telecommunications network is intelligently switched, the telecommunications network comprises a plurality of Advanced Intelligent Network (AIN) components. A communication is received from a device communicating with the telecommunications network. The communication is from a calling party to a called number. The communication could be a telephone call, a telephone call containing data, a data message, or any other electrical signals communicated along the telecommunications network. Processing of the communication within the telecommunications network is suspended. A database is queried for at least one of i) a telephone number of the called party and ii) a telephone number of the calling party. The database stores telephone numbers of subscribers to a lock service provided by a telecommunications service provider. The lock service allows remote activation of an electronic lock using the telecommunications network. If the query is successful, processing of the communication within the telecommunications network is resumed and the communication is used to activate the electronic lock.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein.

DETAILED DESCRIPTION OF THE INVENTION

Figure 1:
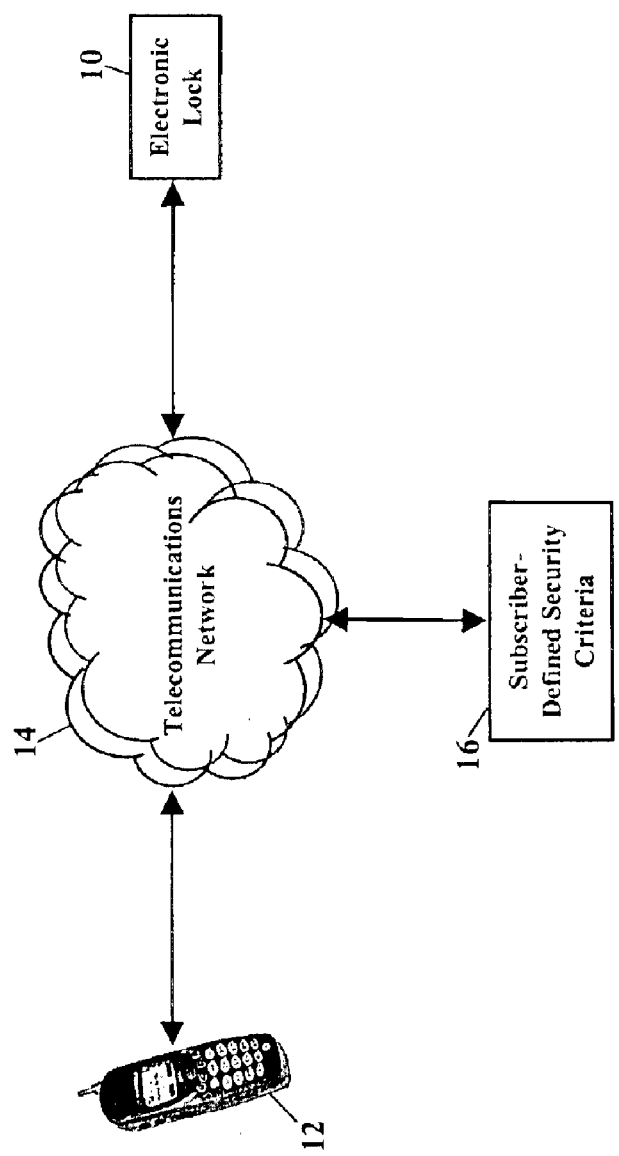
FIG. 1 is a simplified schematic illustrating a lock service provided by a telecommunications service provider.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The present invention provides methods, systems, computer programs, and computer program products that implement a lock service. A Lock Service Manager Module determines whether a called number, a calling number, a called party, and/or a calling party is a subscriber to the lock service. The Lock Service Manager Module implements any subscriber-defined authentication and security criteria. These subscriber-defined criteria could include a userID, a password, a personal identification number ("PIN"), lock number, and any other information useful in identifying an authorized user and a lock to be activated. The Lock Service Manager Module 20 of this invention allows a user to use the telecommunications network to send signals that activate the electronic lock. The user, for example, initiates a communication, such as a telephone call, pager communication, or email/electronic communication, with the telecommunications network. The user typically dials an access number or a telephone number corresponding to one or more electronic locks. If the user correctly dials the number, and successfully negotiates any security or authentication procedures, the telecommunications network processes the communication. The communication may then be used to activate the electronic lock. The lock may be activated by the communication itself, or the communication may contain secure/encrypted data that activates the lock. If the user, however, does not dial the correct telephone number, or does not successfully negotiate the security/authentication procedures, the telecommunications network terminates the communication. The terminated communication, then, may not be used to activate the electronic lock.

FIG. 1 is a simplified schematic illustrating a lock service provided by a telecommunications service provider. A user wishes to remotely activate an electronic lock 10. That is, the term "activate" means the user wishes to remotely lock, or unlock, the electronic lock 10. The electronic lock 10 may be a door lock, a realtor lock box, a safe, or any other locking mechanism that may be electronically activated. In this invention the electronic lock 10 is activated using signals from a communications device 12. The communications device 12 activates the electronic lock 10 via a telecommunications network 14. When the user wishes to activate the electronic lock 10, the user initiates a communication with the telecommunications network 14. The telecommunications network 14 determines if the communication satisfies any subscriber-defined criteria 16 for activating the electronic lock 10. If the communication satisfies the subscriber-defined criteria 16, the telecommunications network 14 processes the communication. The communication is communicated along the telecommunications network 14 and used to activate the electronic lock 10.

Figure 2:
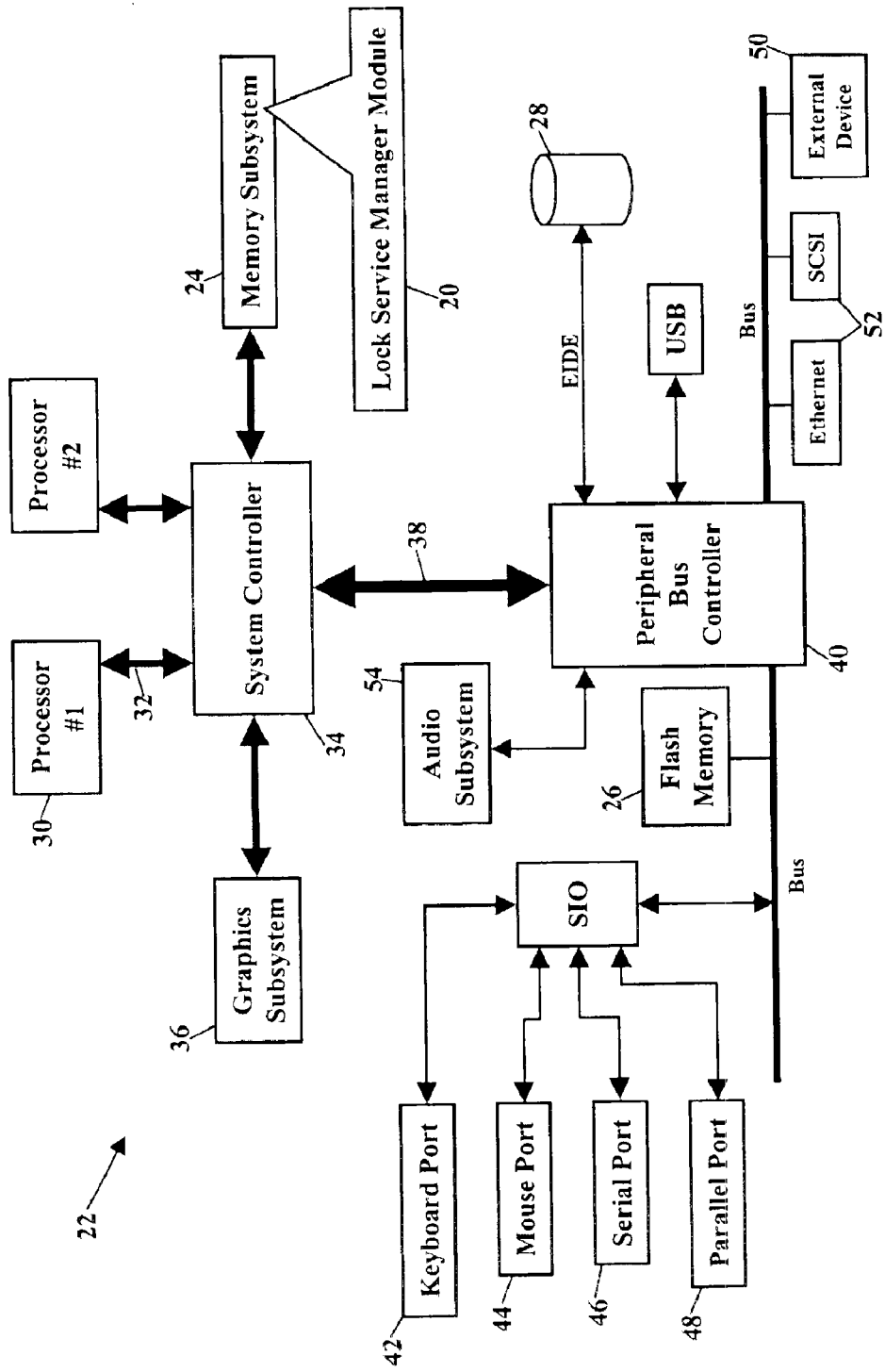
FIGS. 2 and 3 depict possible operating environments for an embodiment of the present invention.
Figure 3:
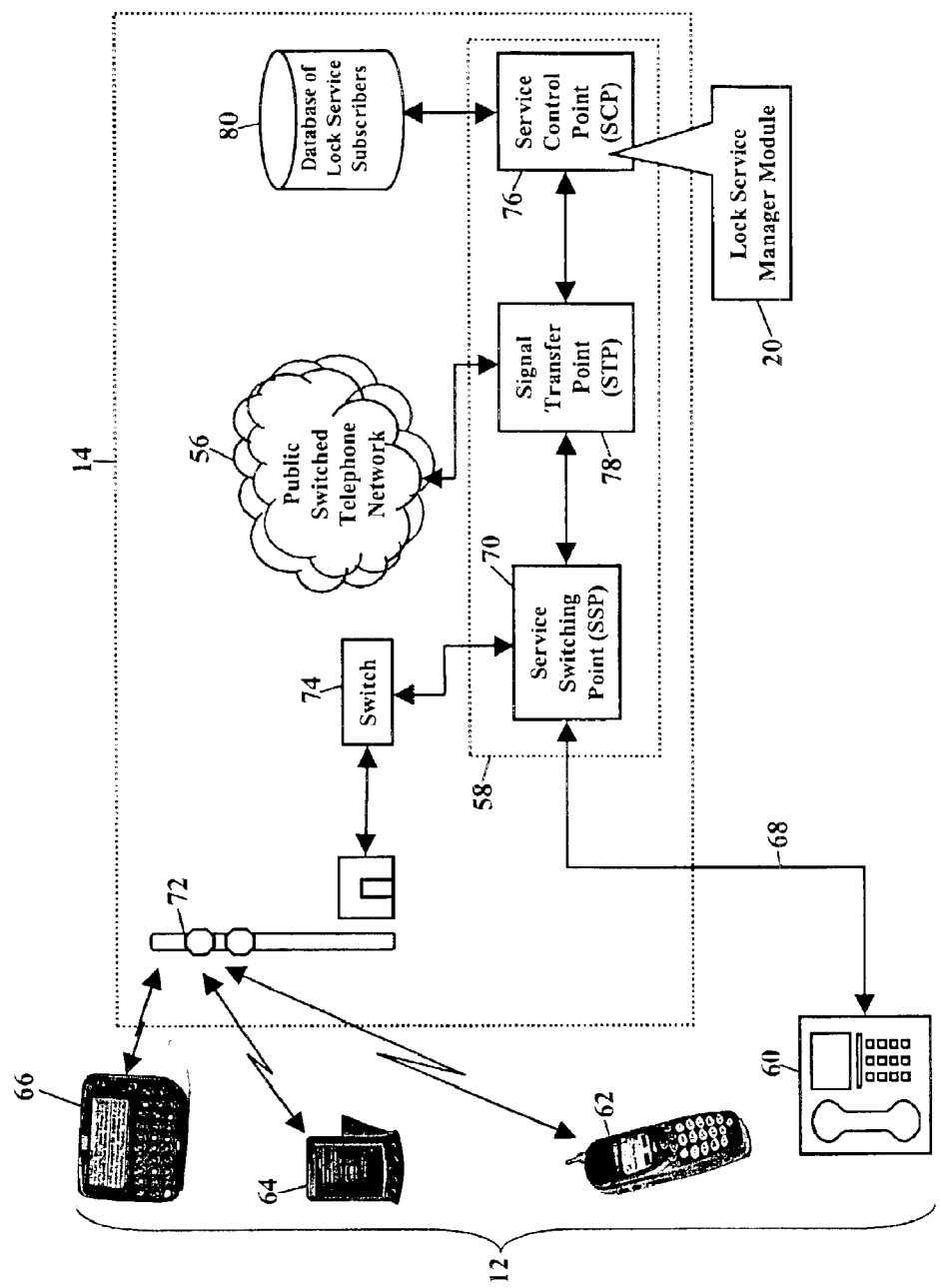

FIGS. 2 and 3 depict possible operating environments for an embodiment of the present invention. The present invention provides methods, systems, computer programs, and computer program products that implement a lock service. A Lock Service Manager Module 20 determines whether a called number, a calling number, a called party, and/or a calling party is a subscriber to the lock service. If the called party is a subscriber, the Lock Service Manager module 20 implements any subscriber-defined authentication and security criteria. If the calling party successfully negotiates the security criteria, the Lock Service Manager Module 20 allows a user to use the telecommunications network to send signals that activate the electronic lock. As those of ordinary skill in the art of computer programming recognize, computer processes/programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 2 is a block diagram showing the Lock Service Manager Module 20 residing in a computer system 22. The Lock Service Manager Module 20 operates within a system memory device. The Lock Service Manager Module 20, for example, is shown residing in a memory subsystem 24. The Lock Service Manager Module 20, however, could also reside in flash memory 26 or in a peripheral storage device 28. The peripheral storage device 28 could include an optical/magnetic storage drive at a remote location. The computer system 22 also has one or more central processors 30 executing an operating system. The operating system, as is well known, has a set of instructions that control the internal functions of the computer system 22. A system bus 32 communicates signals, such as data signals, control signals, and address signals, between the central processor 30 and a system controller 34 (typically called a "Northbridge"). The system controller 34 provides a bridging function between the one or more central processors 30, a graphics subsystem 36, the memory subsystem 24, and a PCI (Peripheral Controller Interface) bus 38. The PCI bus 38 is controlled by a Peripheral Bus Controller 40. The Peripheral Bus Controller 40 (typically called a "Southbridge") is an integrated circuit that serves as an input/output hub for various peripheral ports. These peripheral ports could include, for example, a keyboard port 42, a mouse port 44, a serial port 46 and/or a parallel port 48 for a video display unit, one or more external device ports 50, and networking ports 52 (such as SCSI or Ethernet). The Peripheral Bus Controller 40 could also include an audio subsystem 54. Those of ordinary skill in the art understand that the program, processes, methods, and systems described in this patent are not limited to any particular computer system or computer hardware.

Those of ordinary skill in the art also understand the central processor 30 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 24, flash memory 26, or peripheral storage device 28) may also contain an application program. The application program cooperates with the operating system and with a video display unit (via the serial port 46 and/or the parallel port 48) to provide a Graphical User Interface (GUI). The Graphical User Interface typically includes a combination of signals communicated along the keyboard port 42 and the mouse port 44. The Graphical User Interface provides a convenient visual and/or audible interface with a user of the computer system 22.

FIG. 3 is a schematic diagram of the telecommunications network 14 incorporating the Lock Service Manager Module 20. This telecommunications network 14 further represents an operating environment for the Lock Service Manager Module 20. The telecommunications network 14 may interface with a Public Switched Telephone Network 56. The telecommunications network 14 includes an Advanced Intelligent Network (AIN) 58 controlling many features of the Public Switched Telephone Network 56. The telecommunications network 14 and the Advanced Intelligent Network 58, however, are well understood and will only be simply described. If a reader desires a more detailed explanation, the reader is directed to U.S. Pat. No. 5,430,719 issued to Weisser (Jul. 4, 1995), with the "Summary of the Invention" and the "Detailed Description of the Preferred Embodiment" sections incorporated herein by reference. The reader is also directed to U.S. Pat. No. 5,917,817 issued to Dunn et al. (Jun. 29, 1999), with the "Summary of the Invention" and the "Detailed Description" sections incorporated herein by reference.

As FIG. 3 shows, a calling party places a communication using the communications device 12. As those of ordinary skill in the art of communications understand, the communications device 12 could be a common wireline telephone 60, a wireless/mobile telephone 62, a wireless personal data assistant 64, or a wireless pager 66. The communication could be routed from the common wireline telephone 60, along a landline 68, and received at a Service Switching Point (SSP) 70. The term "wireline" means the telephone 60 sends and receives signals using conductors of electricity. These conductors are commonly the copper wires of a telephone system local loop, however, the term "wireline" also encompasses fiber conductors. The communication, instead, could be wirelessly coupled to an antenna 72, then coupled to a switch 74, and then received by the Service Switching Point 70. The Service Switching Point 70 sends packets of data to a Service Control Point (SCP) 76 via a high-speed packet switch, commonly termed a Signal Transfer Point (STP) 78. These packets of data may include the telephone number of the called party and the telephone number of the calling party. The Service Switching Point 70 then suspends processing of the communication and waits for instructions from the Service Control Point 76.

The Lock Service Manager Module 20 determines if the called number subscribes to a lock service. This lock service is provided by a telecommunications service provider and allows the calling party to remotely activate the electronic lock (shown as reference numeral 10 in FIG. 1). The lock service may allow the calling party to call a predetermined telephone number to remotely activate the electronic lock. The Lock Service Manager Module 20 comprises a computer program operating at, or communicating with, the Service Control Point 76. The Lock Service Manager Module 20 instructs the Service Control Point 76 to query a database 80 of lock service subscribers. If the database 80 of lock service subscribers contains the called telephone number, or the calling telephone number, then the Service Control Point 76 sends processing instructions to the Service Switching Point 70 via the Signal Transfer Point 78. The processing instructions instruct the Service Switching Point 70 to resume processing the communication from the communications device 12.

Figure 4:
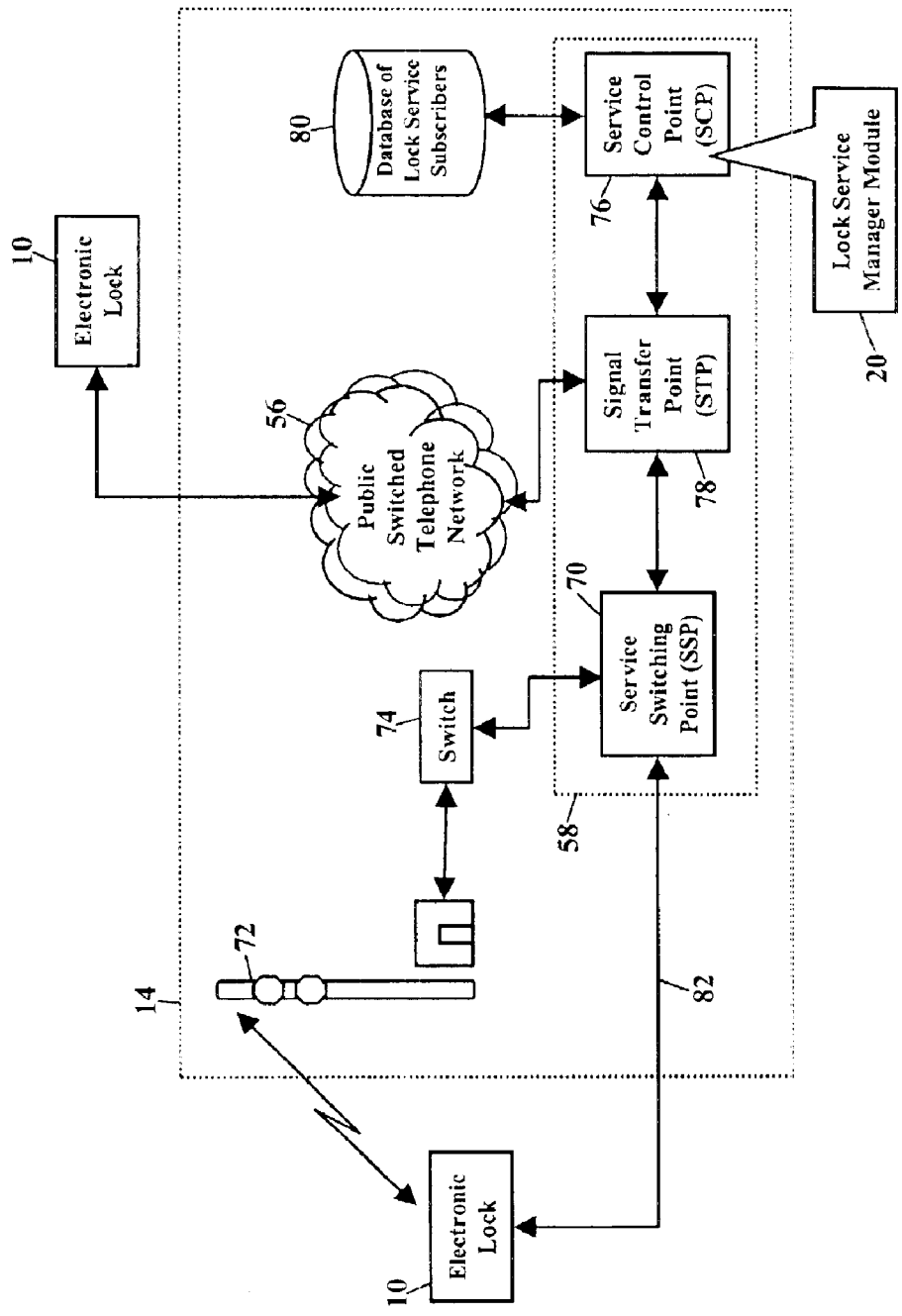
FIG. 4 is a schematic further illustrating the lock service provided by the telecommunications service provider.

FIG. 4 is a schematic further illustrating the lock service provided by the telecommunications service provider. The Lock Service Manager Module 20, as a recap, instructed the Service Control Point 76 to query the database 80 of lock service subscribers. The Service Control Point 76 determined that either the called telephone number, or the calling telephone number, is contained within the database 80. Because either the called party or the calling party is a subscriber, the Service Control Point 76 instructs the Service Switching Point 70 to resume processing the communication from the communications device (shown as reference numeral 12 in FIG. 3). The communication is communicated along the telecommunications network 14. The Service Switching Point 70, for example, may route the communication along a landline 82 to the electronic lock 10. The communication could then be used to activate the electronic lock 10 to a locked or unlocked condition. The Service Switching Point 70 could also route the communication to the antenna 72 via the switch 74. The communication is then wirelessly communicated from the antenna 72 and used to activate the electronic lock 10. The Service Switching Point 70 may determine that the communication should be routed along the Public Switched Telephone Network 56, via the Signal Transfer Point 78, to the electronic lock 10.

Whatever the route of the communication, the communication is used to activate the electronic lock 10. The communication from the communications device (shown as reference numeral 12 in FIG. 3) may itself activate the electronic lock. The electronic lock 10, for example, may communicate with the telecommunications network 14 and is capable of receiving the communication from the communications device. The communication itself, or the content of the communication, activates the electronic lock 10 to at least one of i) the locked condition and ii) the unlocked condition. The electronic lock 10, for example, could activate, or "toggle," between the locked and the unlocked condition with each successive communication. Signals or frequencies contained within the communication could additionally or alternatively activate the electronic lock 10. The communication could also contain packets of data (e.g., a "data burst") that activate the electronic lock 10. The communication could also be used to test one or more electronic locks. The communication could also alert an electronic monitor (or human operator) to activate the electronic lock 10. The communication may also include bioinformatics information—e.g., a fingerprint—that also identifies the calling party. This bioinformatics information could additionally or alternatively include retinal information, voice/audio information, DNA/RNA information, and other identifying information.

If a subscriber is not identified, then the communication is not processed. If the database 80 of lock service subscribers does not contain the telephone number of either the called party or the calling party, then the communication is not processed and not communicated along the telecommunications network 14. Because the communication is not communicated along the telecommunications network 14, the communication cannot be used to remotely activate the electronic lock. The calling party may be offered a predetermined or prerecorded message denying access to the lock service. The communication, however, is preferably terminated, thus forcing the calling party to initiate a new communication with the correct telephone number.

The embodiment shown in FIGS. 3 and 4 offers little security. If the calling party, for example, knows the telephone number of a subscriber to the lock service, the calling party can activate the electronic lock 10. If a subscribing telephone number corresponds to the electronic lock 10, all the calling party need do is dial the subscribing telephone number to activate the electronic lock 10. Many subscribers, therefore, may want additional security measures to prevent unauthorized activation of the electronic lock 10.

Figure 5:
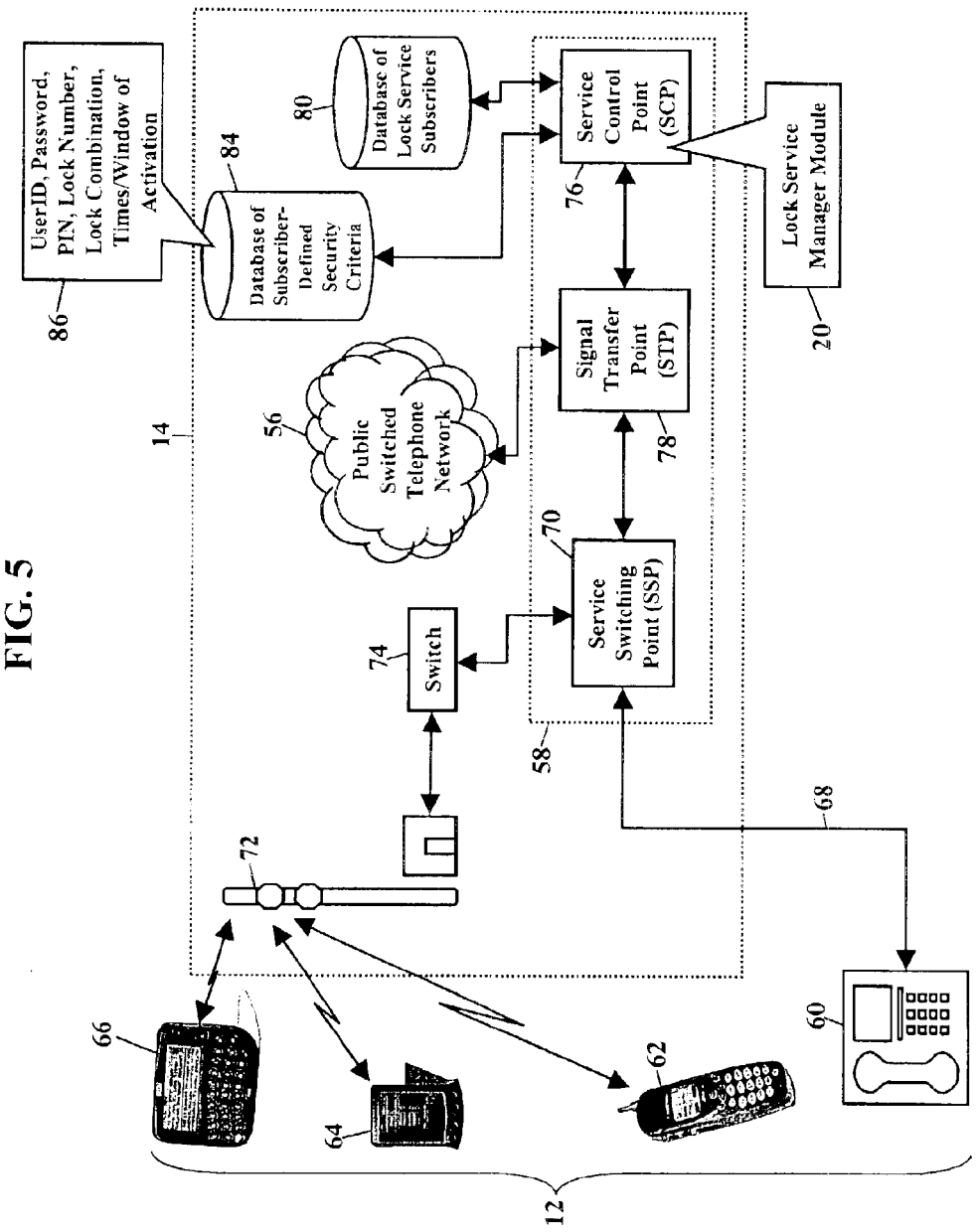
FIG. 5 is a schematic showing another embodiment of this invention providing additional security measures to prevent unauthorized activation of an electronic lock.

FIG. 5 is a schematic showing another embodiment of this invention. This embodiment provides additional security measures to prevent unauthorized activation of the electronic lock (shown as reference numeral 10 in FIGS. 1 and 4). A user, as before, places the communication using the communications device 12. The communication is received by the Service Switching Point 70. The Service Switching Point 70 sends packets of data representing the telephone number of the called party and/or the telephone number of the calling party to the Service Control Point 76 via the Signal Transfer Point 78. The Service Switching Point 70 then suspends processing of the communication while the Service Control Point 76 determines if the called party subscribes to the lock service. The Service Control Point 76 queries the database 80 of lock service subscribers for the telephone number of the called party and/or the telephone number of the calling party. If the database 80 of lock service subscribers contains the telephone number of the called party, or the telephone number of the calling party, then the Service Control Point 76 checks for subscriber-defined security criteria.

The Service Control Point 76 queries a database 84 of subscriber-defined security criteria. This database 84 stores subscriber-defined security criteria for activating the electronic lock (shown as reference numeral 10 in FIGS. 1 and 4). This subscriber-defined security criteria provides enhanced security when activating the electronic lock. As FIG. 5 shows, the subscriber-defined security criteria 86 could include a userID, a password, a personal identification number ("PIN"), a lock number that identifies the particular electronic lock to be activated, a lock combination that activates the electronic lock, times or windows of time for activation, bioinformatics information, and/or any other information useful in identifying an authorized user, in identifying the electronic lock to be activated, and in securely activating that electronic lock.

The subscriber-defined security criteria 86 may require interactions with the calling party. When, for example, the user places the communication using the communications device 12, the subscriber's security criteria 86 may require authentication of the user and/or of the lock before activating the electronic lock (shown as reference numeral 10 in FIGS. 1 and 4). The subscriber's security criteria, for example, may require the user to input, speak, or enter a valid userID, a password and/or a personal identification number ("PIN"), a lock number that identifies the particular electronic lock to be activated, and perhaps a lock combination that activates the electronic lock. The user could then input the required authentication data using the Dual Tone Multi-Frequency (DTMF) keypad on the communications device 12. DTMF signaling is a means of transferring information from the customer to the telecommunications network 14 through the use of in-band audio tones. Each digit of information is assigned a simultaneous combination of one of a lower group of frequencies and one of a higher group of frequencies to represent each digit or character. The telecommunications network could also recognize and accept voice responses to authenticate the user. If the user is authenticated, and any information identifying the particular electronic lock is correctly entered, the communication is communicated along the telecommunications network 14 and used to activate the electronic lock.

Figure 6:
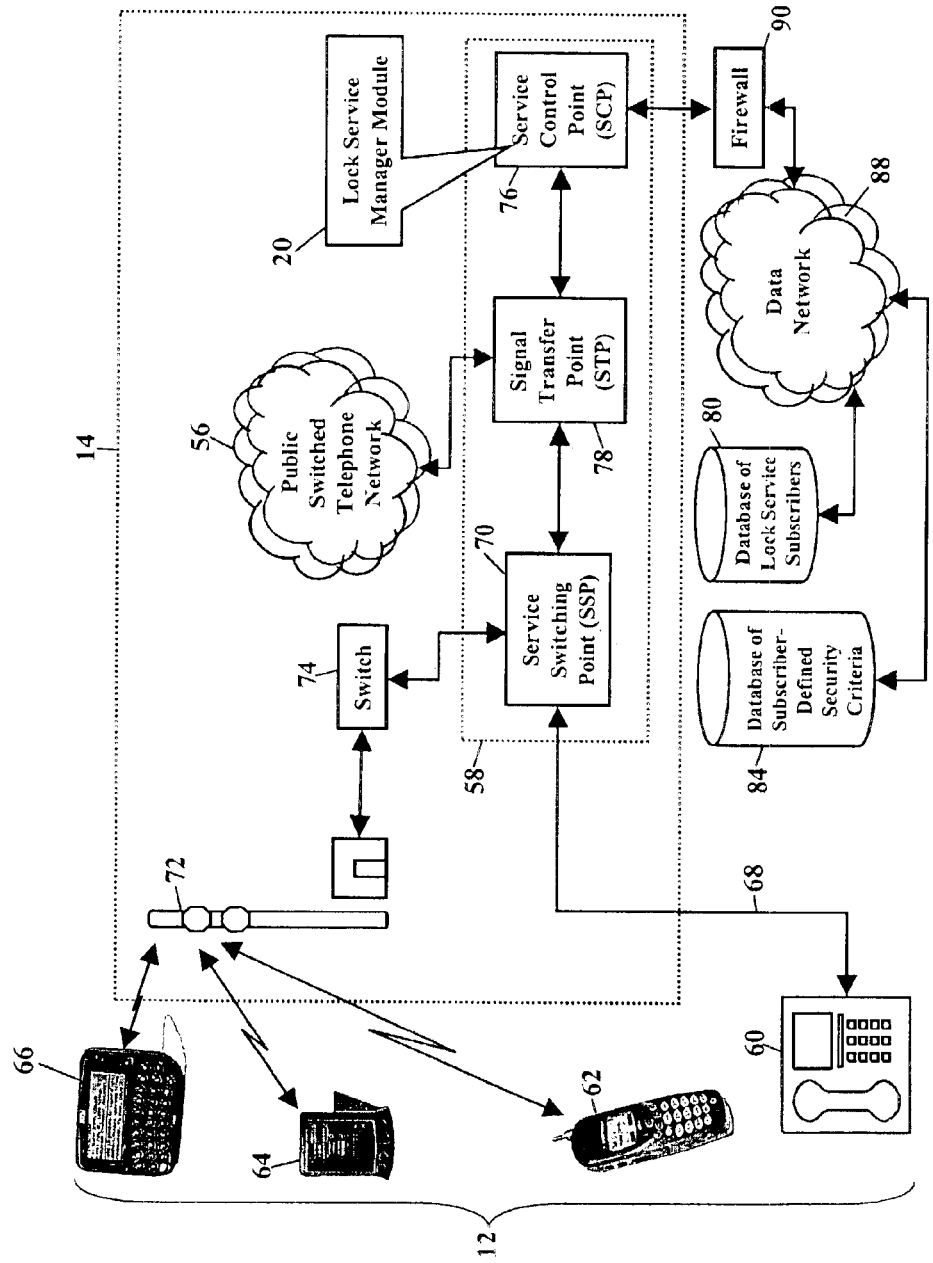
FIG. 6 is a schematic diagram of another embodiment of this invention operating with a data network.

FIG. 6 is a schematic diagram of another embodiment of this invention. Here the database 80 of lock service subscribers, and the database 84 of subscriber-defined security criteria, operates on a data network 88. The Service Control Point 76 retrieves a subscriber's security criteria from the remotely-located database 84 of subscriber-defined security criteria. As those of ordinary skill in the art of telephony, and in the art of computer networking, understand, the database 80 of lock service subscribers, and the database 84 of subscriber-defined security criteria, could be remotely maintained on a computer connected to a Local Area Network (LAN), a Wide Area Network (WAN), or a globally-distributed computing network (e.g., the "Internet"). As those of ordinary skill in both telephony and in computer networking understand, the data network 88 allows the Service Control Point 76 to request and acquire information from many computers physically or wirelessly connected to the data network 88. The Service Control Point 76 could negotiate a firewall security system 90, access the data network 88, and store and retrieve a subscriber's security criteria on the remotely-located database 84 of subscriber-defined security criteria.

Figure 7:
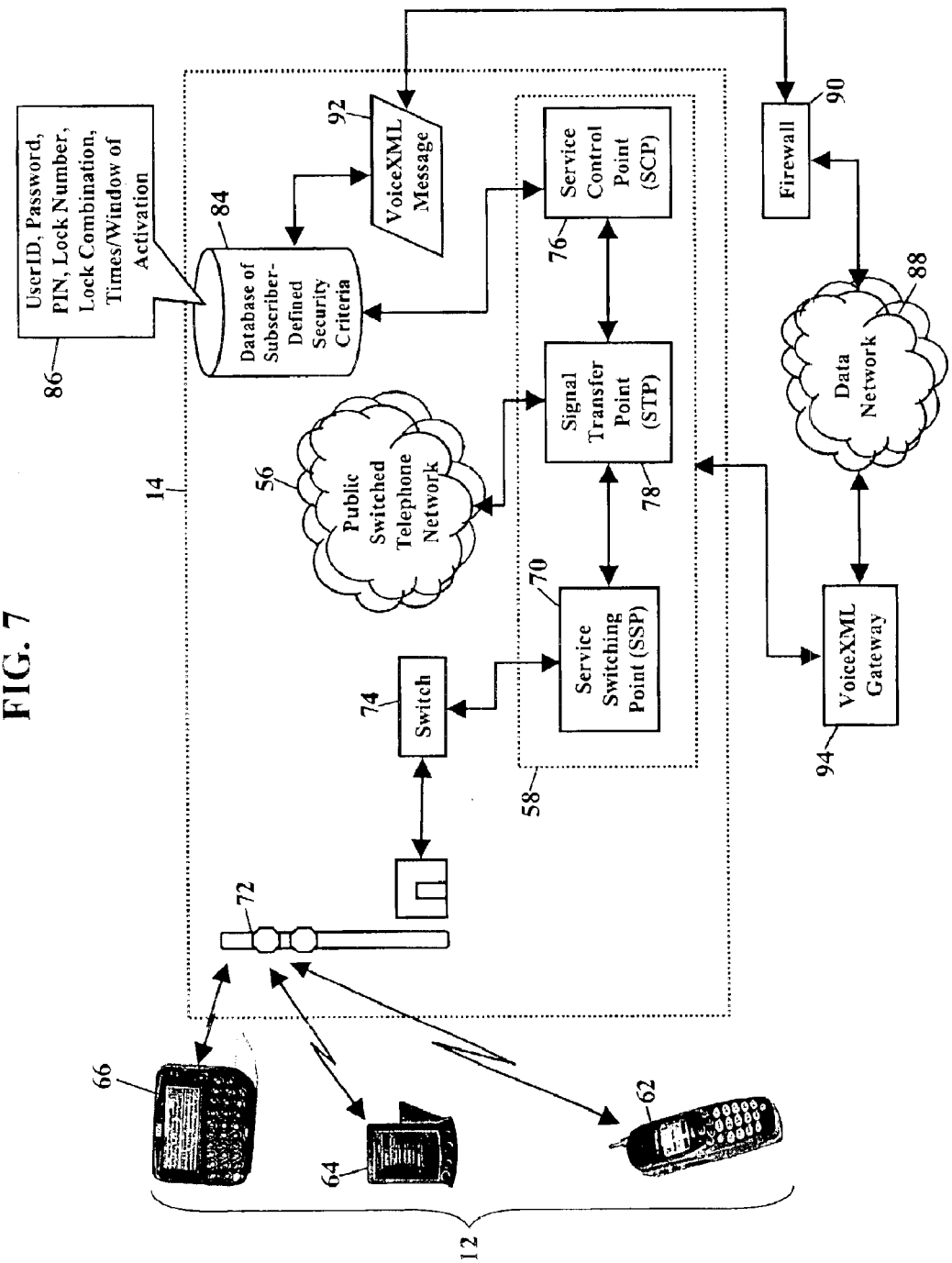
FIG. 7 is a schematic illustrating yet another embodiment of this invention that authenticates a user of a wireless communications device.
Figure 8:
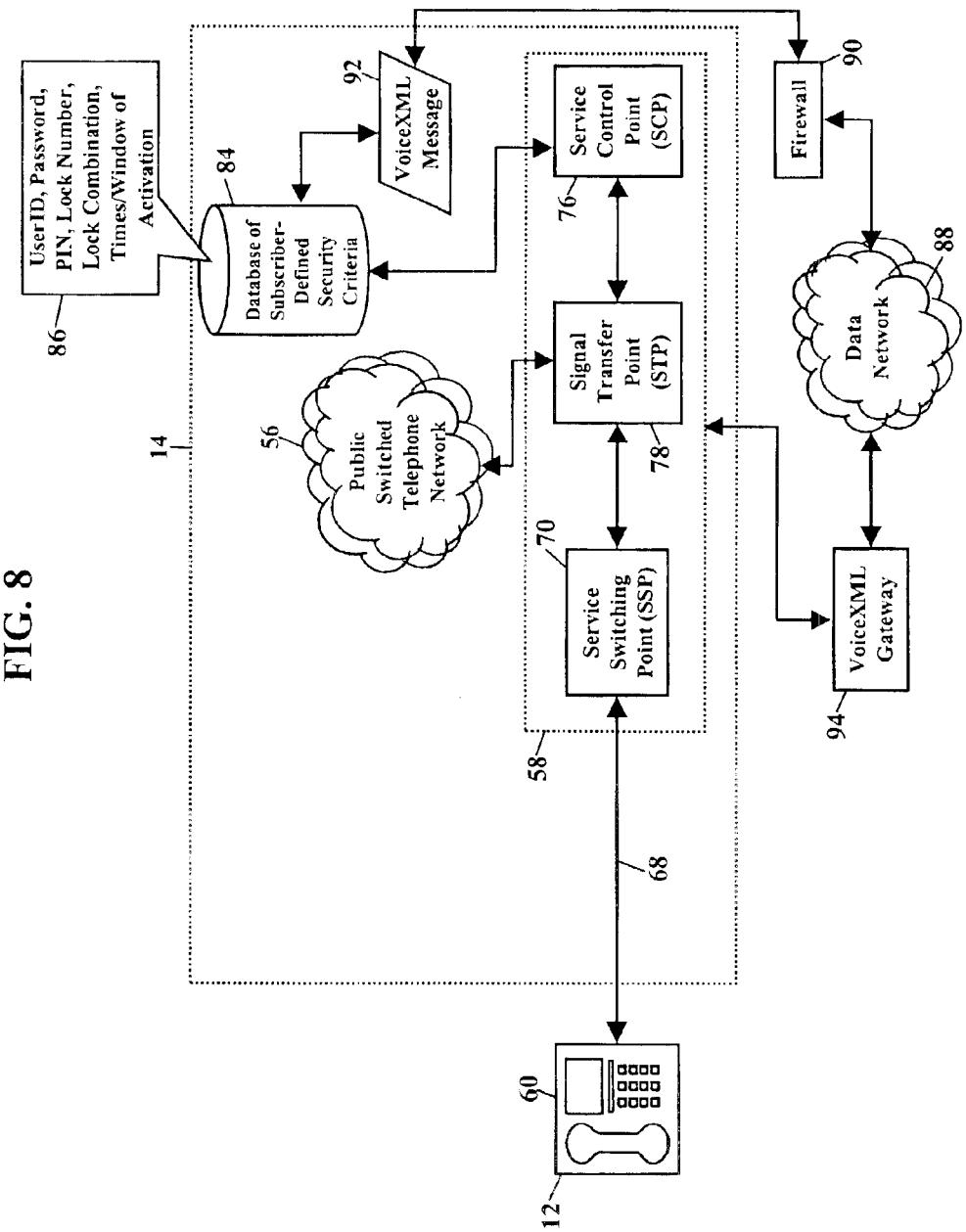
FIG. 8 is a schematic illustrating an embodiment of this invention that authenticates a user of a common wireline telephone.

FIGS. 7 and 8 are schematics illustrating still more embodiments of this invention. These embodiments utilize VoiceXML concepts to authenticate the user and the electronic lock. FIG. 7 illustrates authentication of the user using a wireless communications device 12, such as the wireless/mobile telephone 62, the wireless personal data assistant 64, or the wireless pager 66. FIG. 8, however, illustrates authentication of the user using the common, wireline telephone 60. This embodiment illustrates authentication of the user using speech recognition, text-to-speech communication, and/or Dual Tone Multi-Frequency (DTMF) signaling. The database 84 of subscriber-defined security criteria, as mentioned earlier, stores subscriber-defined security criteria for activating the electronic lock (shown as reference numeral 10 in FIGS. 1 and 4). This subscriber-defined security criteria provides enhanced security when activating the electronic lock. When the subscriber's security criteria requires entry of a valid userID, a password/PIN, and/or any other data, the database 84 of subscriber-defined security criteria causes a VoiceXML message 92 to be sent over the data network 88 to a VoiceXML gateway 94. As FIG. 7 shows, the VoiceXML gateway 94 sends the VoiceXML message 92 to the Advanced Intelligent Network 58 controlling many features of the Public Switched Telephone Network 56. The VoiceXML message 92 is routed to the proper Service Switching Point 70. The VoiceXML message 92 is then communicated to the switch 74 and then wirelessly communicated to the user's communication device 12 via the antenna 72.

This VoiceXML message 92 prompts the user to input/enter/speak the required authentication information. The VoiceXML message 92 is sent to the user's communications device 12 using VoiceXML (Voice extensible Markup Language). The user may then speak the required authentication responses or input the required authentication data using the Dual Tone Multi-Frequency (DTMF) keypad on the communications device 12. Those of ordinary skill in the art of telecommunications understand the VoiceXML gateway 94 enables access to, and modification of, web-based information through a normal voice interface. VoiceXML, in addition, provides for automatic speech recognition and/or text-to-speech communication. VoiceXML, therefore, provides understandable communication between the user, using the communications device 12, and the database 84 of subscriber-defined security criteria. The VoiceXML technique, the VoiceXML gateway 94, and the DTMF technique are known and will not be further described.

FIG. 8 illustrates authentication of the user using the wireline telephone 60. When the subscriber's security criteria requires entry of a valid userID, a password/PIN, and/or any other data, the database 84 of subscriber-defined security criteria causes the VoiceXML message 92 to be sent over the data network 88 to the VoiceXML gateway 94. The VoiceXML gateway 94 then interfaces with the Advanced Intelligent Network (AIN) 58 to compose a message for the user at the wireline telephone 60. When the customer receives the message at the wireline telephone 60, the user may then speak the required authentication responses or input the required authentication data using the Dual Tone Multi-Frequency (DTMF) keypad on the wireline telephone 60.

Figure 9:
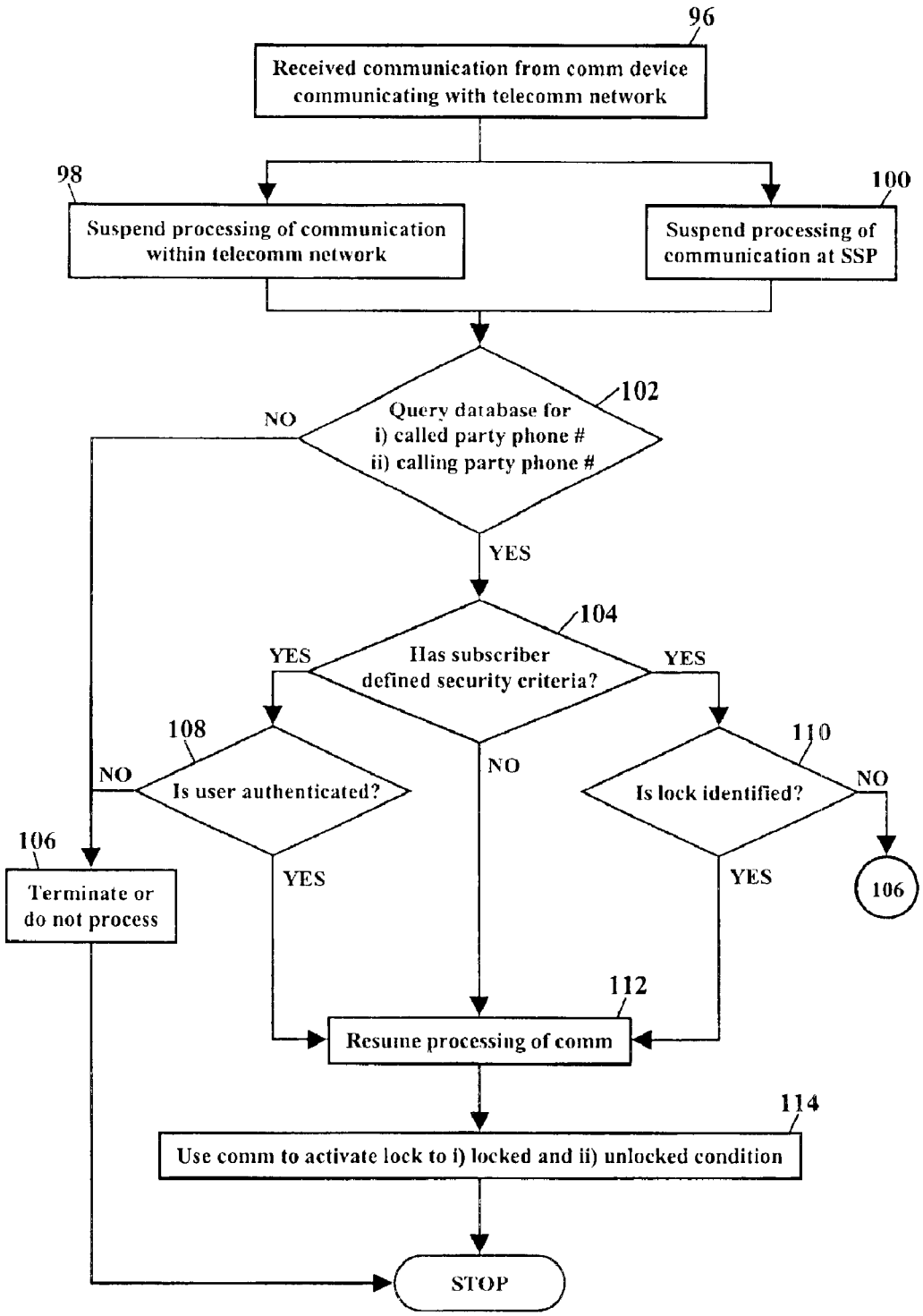
FIG. 9 is a flowchart illustrating a method for using a telecommunications network to activate an electronic lock.

FIG. 9 is a flowchart illustrating a method for activating an electronic lock. A communication is received from a communications device communicating with an intelligently switched telecommunications network (Block 96). The intelligently switched telecommunications network has a plurality of Advanced Intelligent Network (AIN) components controlling aspects of the telecommunications network. Processing of the communication within the telecommunications network is suspended (Block 98). The communication is preferably suspended at a Service Switching Point on the telecommunications network (Block 100). A database is queried for at least one of i) a called telephone number and ii) a calling telephone number (Block 102). The database stores telephone numbers of subscribers to a lock service provided by a telecommunications service provider. The lock service uses the telecommunications network to allow remote activation of an electronic lock. If the query is successful, the method determines whether the subscriber has defined security criteria for activating the electronic lock (Block 104). If the query is not successful (Block 102), the communication is terminated or is not communicated along the telecommunications network (Block 106). If the subscriber has defined security criteria (Block 104), the user is authenticated (Block 108) and the electronic lock may be identified (Block 110). If the user is authenticated and/or the electronic lock is identified, processing of the communication within the telecommunications network is resumed (Block 112) and the communication may be used to activate the electronic lock to at least one of i) a locked condition and ii) an unlocked condition (Block 114). If the user is not authenticated (Block 108), or the electronic lock is improperly identified (Block 110), the communication is terminated or not communicated (Block 106).

The Lock Service Manager Module (shown as reference numeral 20 in FIGS. 2–6) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Lock Service Manager Module to be easily disseminated. A computer program product for using a telecommunications network to activate an electronic lock comprises the computer-readable medium and the Lock Service Manager Module. The Lock Service Manager Module is stored on the computer-readable medium.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. In an intelligent switched telecommunications network having a plurality of Advanced Intelligent Network (AIN) components, a method for activating an electronic lock, comprising:

receiving a communication from a device communicating with the telecommunications network, the communication from a calling telephone number;

suspending processing of the communication within the telecommunications network;

querying a database for at least one of i) a called telephone number and ii) a calling telephone number, the database storing telephone numbers of subscribers to a lock service provided by a telecommunications service provider, the lock service using the telecommunications network to allow remote activation of an electronic lock; and if the query is successful, resuming processing of the communication within the telecommunications network, wherein the communication is used to activate the electronic lock.

2. A method for activating an electronic lock according to claim 1, wherein the step of querying the database for the called telephone number comprises a Service Control Point querying the database.

3. A method for activating an electronic lock according to claim 1, wherein the step of suspending processing of the communication comprises suspending the communication at a Service Switching Point on the telecommunications network.

4. A method for activating an electronic lock according to claim 1, further comprising authenticating the user.

5. A method for activating an electronic lock according to claim 1, further comprising identifying the electronic lock to be activated.

6. A method for activating an electronic lock according to claim 1, further comprising communicating the communication along the telecommunications network to the electronic lock, the electronic lock communicating with the telecommunications network, the communication activating the electronic lock to at least one of i) a locked condition and ii) an unlocked condition.

7. A method for activating an electronic lock according to claim 6, wherein the communication comprises information identifying the electronic lock to be activated.

8. A method for activating an electronic lock according to claim 1, further comprising communicating the communication along the telecommunications network to a plurality of electronic locks, the communication causing at least one electronic lock to activate.

9. A method for activating an electronic lock according to claim 8, wherein the communication comprises information identifying the at least one electronic lock to be activated.

10. A method for activating an electronic lock according to claim 1, further comprising wirelessly communicating the communication from the telecommunications network to the electronic lock.

11. A telecommunications network for processing a communication, comprising the following Advanced Intelligent Network (AIN) components:

a Service Control Point processing system for providing lock service to a subscriber, the Service Control Point processing system comprising a processor accessing a database of telephone numbers of called parties subscribing to the lock service, the lock service allowing a user to remotely activate an electronic lock using the telecommunications network.

* * * * *